UNITED STATES PATENT OFFICE.

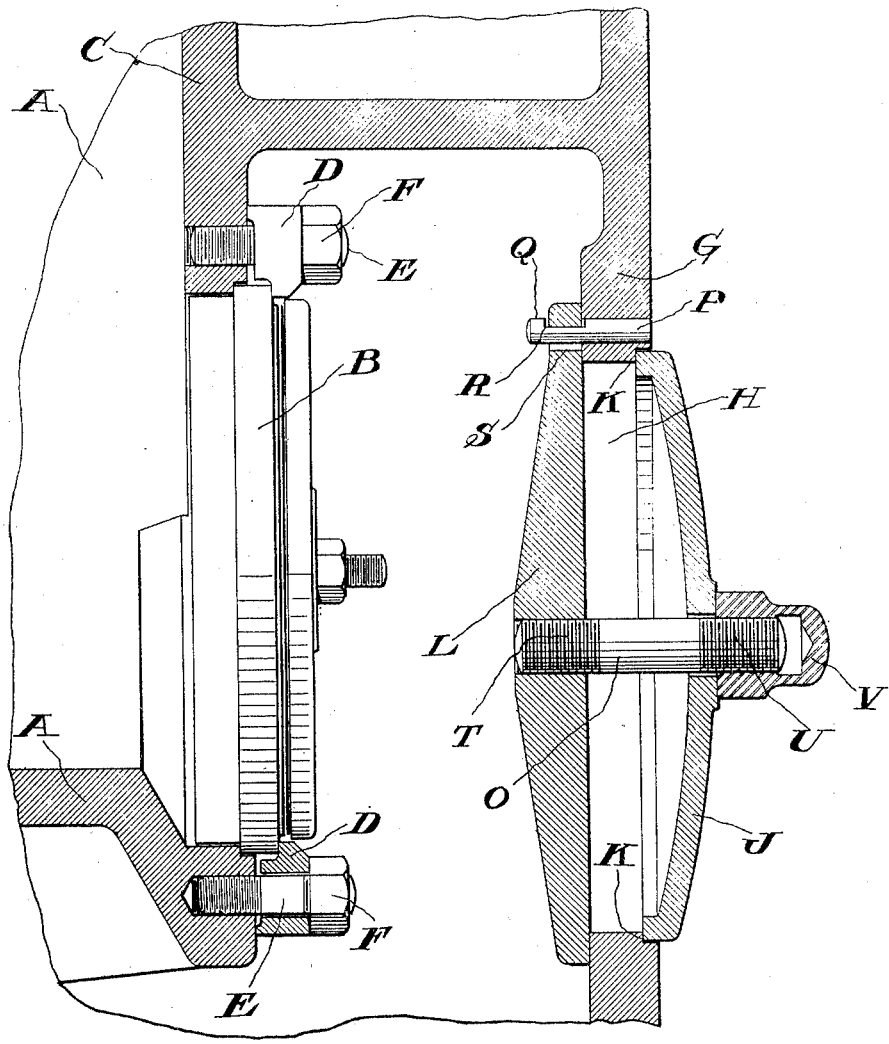

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

COVER-RETAINER FOR VACUUM-PUMPS.

1,372,037.

Specification of Letters Patent.

Patented Mar. 22, 1921.

Application filed November 9, 1920. Serial No. 422,978.

*To all whom it may concern:*

Be it known that I, FREDERICK W. PARSONS, a citizen of the United States, and a resident of Elmira, county of Chemung, and State of New York, have invented certain new and useful Improvements in Cover-Retainers for Vacuum-Pumps, of which the following is a specification.

This invention relates to vacuum pumps and the like, but more particularly to a cover retainer for securing and retaining the covers in position in the outer walls of the head over the valves.

Such covers are not necessarily air tight and may be secured in position by means of a yoke bearing against the walls of the head inside the cover aperture. In one usual form of device, a stud is provided for securing the cover to the yoke but as the yoke is within the head, while the cover is outside, there is difficulty in centering the apertures for the stud in the yoke and cover.

The primary object of the present invention is to secure a satisfactory and simple device for pivotally holding or suspending the yoke within the head so that it may swing into position across the cover aperture with the stud in central position in readiness for securing the cover thereto. The yoke may be pushed aside when it is desired to change or adjust a valve but will swing or may be moved back into position across the cover aperture when the cover is to be secured in position.

The invention is shown in one of its preferred forms in the accompanying drawing, which is a diagrammatic broken vertical sectional view taken through a portion of the cylinder and discharge head of a vacuum pump, and showing sufficient parts of the pump to illustrate the invention.

Referring to the drawing, a portion of a pump cylinder A is shown provided with a discharge valve B preferably a plate valve of which there may be a plurality, suitably secured to the head C of the cylinder, as by means of the clips D, studs E and nuts F.

The outer wall G of the head is provided with one or more apertures H adapted to be closed by the cover or covers J bearing on the rabbeted or recessed portion K.

In this instance, the cover is secured by means of a yoke L within the head and bearing on the wall G at each side of the aperture H. A stud O is provided for connecting the cover to the yoke.

Instead of removing the yoke entirely from the aperture for inserting or replacing a valve, with the attendant difficulty in replacing and centering the yoke and cover, I provide means for hanging or pivotally holding the yoke opposite the aperture H, and for this purpose a yoke supporting pin P projects inwardly from the wall G adjacent the rim of the aperture H and above the aperture. This pin is preferably provided with a hooked end Q which may be formed by a groove or recess R at the end of the pin.

The yoke is provided with an aperture S large enough to pass over the hooked end Q of the pin so that the yoke will hang in the groove or recess R and lie centrally across the aperture H, unless pushed aside. The stud O is preferably secured to the center of the yoke as by means of the screw threaded portion T and the cover J may be secured to the outer screw threaded end U of the stud as by means of the nut V. The device is simple but satisfactory in operation and obviates the difficulty of centering two members which are on opposite sides of a wall, so that the inner member is inaccessible when the outer member is to be secured thereto.

I claim:

1. A cover retainer for vacuum pumps and the like, comprising in combination with the cover, a yoke supporting pin projecting inwardly from the outer wall of the pump head adjacent the rim of an aperture adapted to be closed by the cover, and a yoke retainer pivotally hung from said pin and provided with a stud projecting outwardly through the said aperture affording means for securing and retaining the cover in place over the aperture.

2. A cover retainer for vacuum pumps and the like, comprising in combination with the cover, a yoke supporting pin projecting inwardly from the outer wall of the pump head adjacent the rim of an aperture adapted to be closed by the cover, said pin having a hooked end, and a yoke retainer having an aperture in one end adapted to pass over the hooked end of the supporting pin whereby the yoke may be swung on the pin but will be retained adjacent the aperture, said yoke having a stud projecting outwardly through the said aperture affording means for securing the cover thereto.

In testimony whereof I have signed this specification.

FREDERICK W. PARSONS.